March 25, 1969

C. O. MERCHANT ET AL 3,434,819

COLOR GUN BEADING APPARATUS

Filed June 10, 1966

INVENTORS
CHESTER O. MERCHANT
JAY H. JOHNSON

BY Watson, Cole, Grindle
& Watson
ATTORNEYS

March 25, 1969  C. O. MERCHANT ET AL  3,434,819
COLOR GUN BEADING APPARATUS
Filed June 10, 1966                              Sheet 3 of 7

INVENTORS
CHESTER O. MERCHANT
JAY H. JOHNSON
BY Watson, Cole, Grindle & Watson
ATTORNEYS

FIG. 9

INVENTORS
CHESTER O. MERCHANT
JAY H. JOHNSON

BY Watson, Cole, Grindle & Watson
ATTORNEYS

March 25, 1969 C. O. MERCHANT ET AL 3,434,819
COLOR GUN BEADING APPARATUS
Filed June 10, 1966

INVENTORS
CHESTER O. MERCHANT
JAY H. JOHNSON

BY Watson, Cole, Grindle & Watson

ATTORNEYS

United States Patent Office 3,434,819
Patented Mar. 25, 1969

3,434,819
COLOR GUN BEADING APPARATUS
Chester O. Merchant and Jay H. Johnson, Owensboro, Ky., assignors to Kentucky Electronics, Inc., Owensboro, Ky., a corporation of Kentucky
Filed June 10, 1966, Ser. No. 556,654
Int. Cl. C03c 27/02
U.S. Cl. 65—155                                    4 Claims

ABSTRACT OF THE DISCLOSURE

Apparatus for manufacturing electron gun assemblies for color picture tubes is disclosed wherein a replaceable jig holds a plurality of electrodes with extending brackets in final position in a beading machine for receiving three molten glass rods impaled simultaneously on the brackets to permanently hold the parts in place. The rods are moved along a straight line after being heated on their face by a heater interposed in the movement path of the rods as the heater is pivoted out of the pathway.

This invention relates to manufacture of three beam electron gun assemblies for color tubes and more particularly, it relates to means for affixing the electrodes in final assembly position by insertion of mounting brackets into molten glass beads.

Because of the many different electrodes which must be carefully matched and spaced to produce the precision required for color guns, the state of the art heretofore resulted in a high percentage of rejects and cumbersome and time consuming assembly techniques with many separate operations.

It is difficult to assemble color guns because the beam axes are precisely oriented at a slight convergence angle. This prevents extension of conventional techniques of assembling single beam guns into a unitary three beam gun assembly.

Accordingly, it is an object of this invention to provide comprehensive special equipment for efficient assembly and beading of the various electrodes into a three beam electron gun.

This equipment for loading the equipment and sequencing operations should serve to correct some of the problems existing in prior art apparatus.

Thus, it is an object of the invention to produce an automatic beading machine which may be simply loaded with conventional electrodes.

A more specific object of the invention is to provide means of establishing a firm and precise final orientation of the electrodes for receiving a molten glass bead.

Still another object of the invention is to provide a jig for holding the various electrodes in a converged relationship which nevertheless permits quick release of a completed gun rigidly held in place by glass beads.

Another object of the invention is to provide precise positioning of a molten glass bead to engage and harden about electrode brackets.

Yet another object of the invention is to provide simple and effective mechanisms for simultaneously inserting all beads of a three beam color tube into precise locations.

Another objective of this invention is the provision of a glass bead having only that portion molten which is to encompass the electrode mounting brackets.

These objects together with further features and advantages are realized in accordance with this invention in an embodiment of an automatic beading machine which places three molten glass beads simultaneously on a group of individual electrodes held in temporary position in a special assembly jig. The jig has three stems held in proper convergence relationship to internally mate with the electrodes along the respective beam axes of the three guns, while the beads are inserted, but fashioned for ready removal from the electrodes without binding because of the convergence angles.

Special jig members are provided for spacing and orienting the electrodes precisely without significantly interfering with the procedure of loading the electrodes in position.

Thus, the loading jig is easily removed from the beading machine, and the finished gun assembly is readily removed from the jig by simple linear motion in retraction of spacers and mounting cams used to clamp the individual electrodes in place for beading.

The electrodes are loaded at one end upon a set of three stems extending from a lower platform at a convergence angle. Spacers are inserted between adjacent electrodes by linear motion through three peripheral mounting posts framing the lower platform and serving to receive a removable upper platform holding the stems in place for axial frictional clamping of the electrodes in place with axial pressure on the stems.

Electronic control means provide for automatic cycling of the beading machine to insert molten glass beads upon an electrode assembly held in position in the special jig or mandrel provided by this invention.

The invention is described in more detail in the following specification with reference to the various views in the accompanying drawing, wherein.

The electron gun

Figure 1:
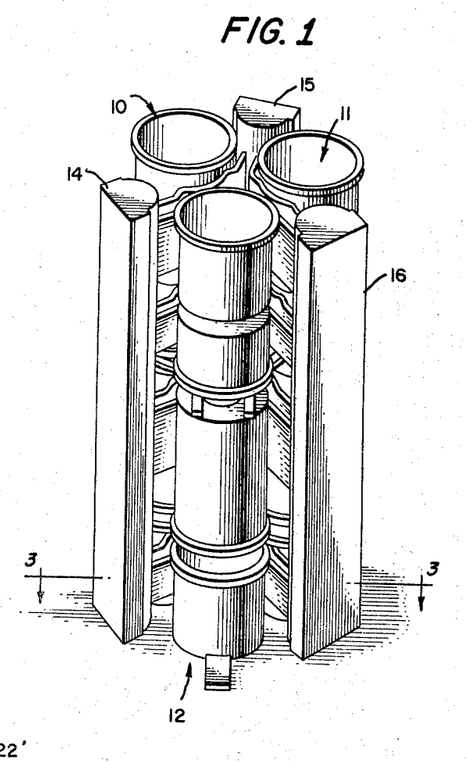
FIGURE 1 is a perspective view of a three beam electron gun assembly for a color tube.

Referring now particularly to the view of FIGURE 1, the electron gun assembly provides for the three beams of a color tube with three respective stacks of electrodes 10, 11, and 12, which are respectively aligned with their axes at a slight convergence angle in order to provide the merger of the three electron beams at one position in the vicinity of a shadow mask array which is placed near a color screen. The three sets of electrodes are held in position by means of three glass beads 14, 15, and 16 which are positioned in between each pair of electron gun assemblies in order to receive embedded therein mounting straps from the individual electrodes to hold them firmly in place.

Figure 2:
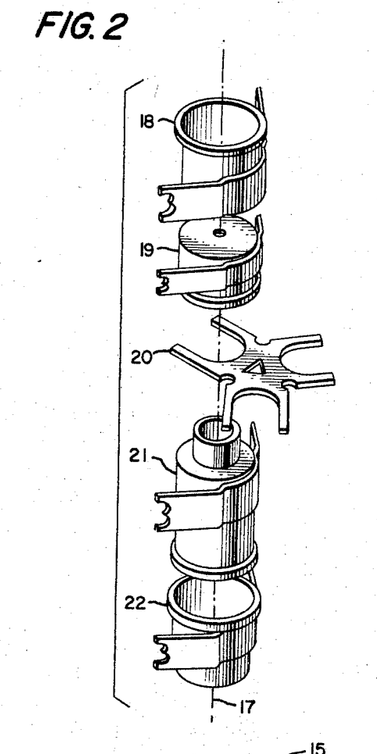
FIGURE 2 is an exploded view of the electrodes aligned along the beam axis.
Figure 3:
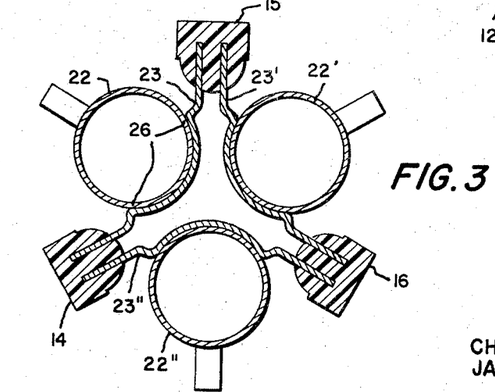
FIGURE 3 is a cross section view of the three gun assembly of FIGURE 1 taken along lines 3—3.
Figures 4, 5:
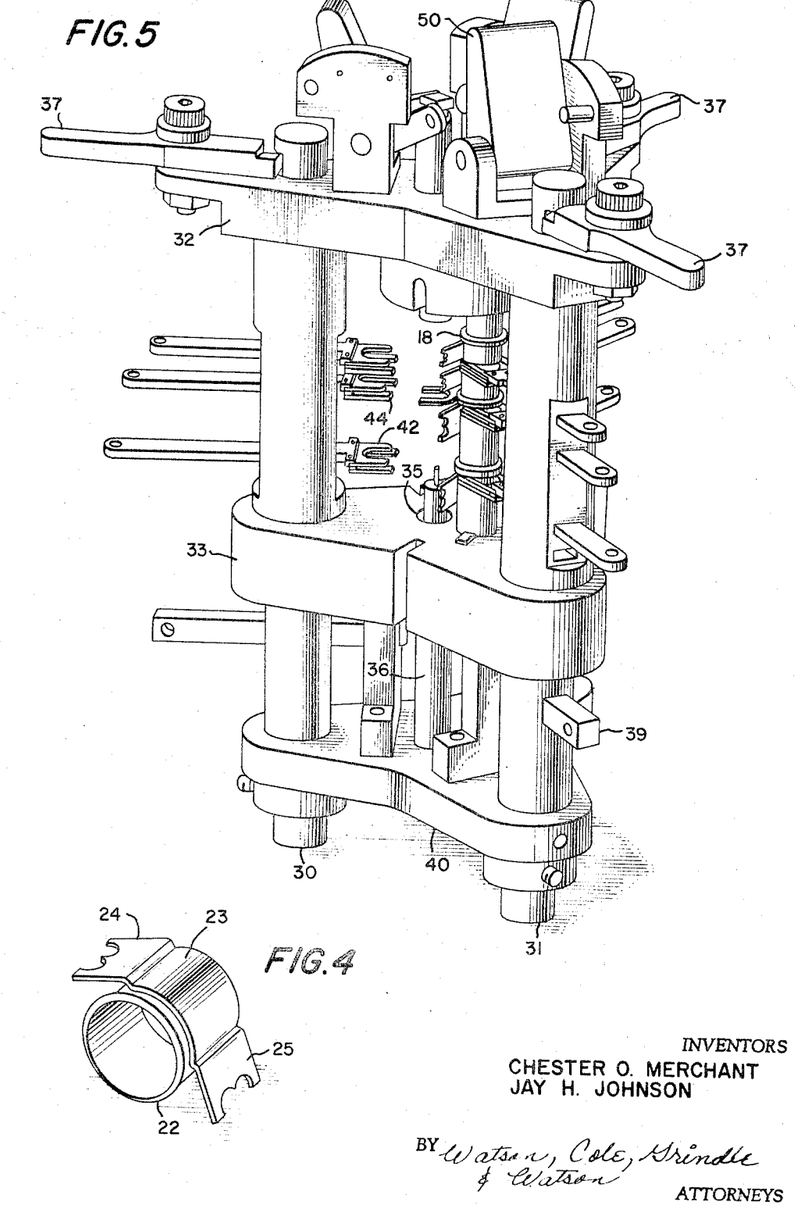
FIGURE 4 is a perspective view of an electrode having a mounting strap thereon.
FIGURE 5 is a perspective view of a jig assembly upon which the individual electrodes are assembled during manufacture.

The individual array of the electrodes may vary with different electron gun designs, but a typical embodiment is shown in exploded form in FIGURE 2 wherein the electron beam axis 17 is shown along which various electrodes are concentrically arrranged. In this array, starting from the top, the electrodes may be a first control grid 18, a second control grid 19, a connector strap 20 positioned between control grid 19 and the focusing electrode 21, and an accelerating anode 22. As shown in FIGURES 3 and 4, each electrode has welded thereon a mounting bracket 23 which has arms 24 and 25 extending substantially tangentially from the cylindrical portion of the electrode on opposite sides of a segmental portion 26 of the electrode. The respective arms 24 and 25 are paired and embedded at spaced positions into the glass beads 14, 15, and 16, to hold the electrodes firmly in position as shown in FIGURES 1 and 3.

The gun jig

Figures 6, 7, 8:
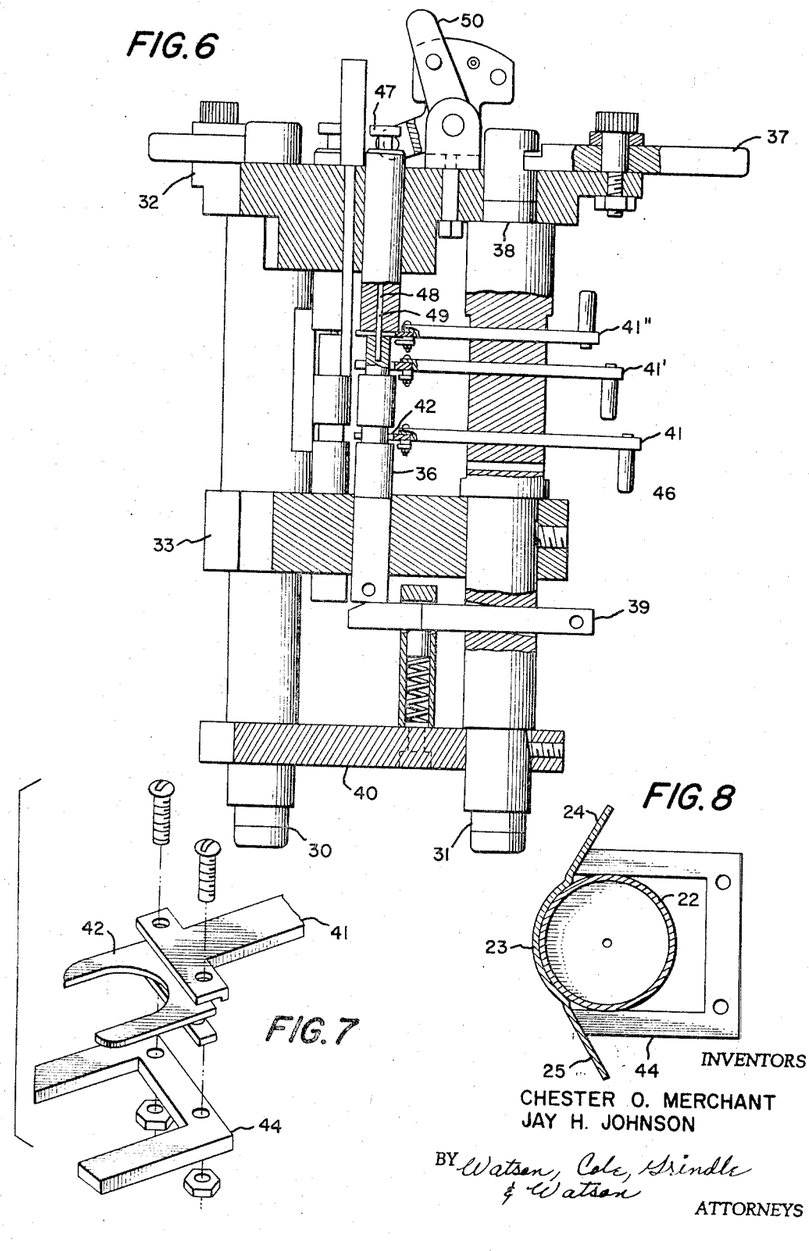
FIGURE 6 is a side view, partially in section, of the jig assembly of FIGURE 5.
FIGURE 7 is an exploded view of an electrode spacer subassembly used in the jig of FIGURES 5 and 6.
FIGURE 8 is a top view, partially in section, of an electrode and alignment member as finally positioned in the jig assembly of FIGURE 5.

In order to hold these electrodes in appropriate position during assembly before inserting the glass beads 14, 15, and 16 upon the bracket arms, the jig array of FIGURES 5 and 6 is provided. In general, this jig has three sectors for the respective gun assemblies, each related to a different mounting post 30, 31, etc. which are laid out in a generally triangular array held by alignment platforms 32 and 33. In each of these alignment platforms are apertures 35 drilled to receive a set of three stems 36 having thereon a series of substantially cylindrical surfaces shaped to mate internally in the plurality of electron gun electrodes aligned along each beam axis. The angle of the apertures 35 drilled through the alignment platforms 32 and 33 is such that the three stems hold the electron beam axes at the proper convergence angle.

The upper platform 32 is removable from the posts 30, 31 by means of levers 37 which turn to lock into notches 34 on the topmost section of the posts 30 and 31. As may be seen from FIGURE 6, the top platform 32 seats upon the shoulder 38 when the clamping levers 37 are in place upon the reduced topmost diameter of the mounting shafts 30 and 31. In this manner, the entire top assembly may be removed to provide access to the upper end of the three stems 36 to permit placement of the individual electrodes thereon. In order to place the electrodes upon the stems they are held in an uppermost position extending through the upper side of the platform 33 by means of the sliding cam 39 extending through one of the posts 30, 31 underneath the alignment platform 33. The sliding cam 39 may be removed after the guns are supplied with the glass beads to permit the stem assembly 36 to fall in the lowermost position as shown in FIGURE 5 extending through the lower side of platform 33 and resting upon a lower platform stop 40. In this position the completed electron gun assembly having all the elements held together by the beads may be removed from platform 33 without binding because of the convergence angle of the three stems which snugly fit inside the electrodes.

As each electrode is placed in position sequentially upon the corresponding cylindrical portion of the stem 36, it is spaced along the beam axis from the next electrode the proper distance by means of an independently movable spacer 41 which is slid through a bearing channel in the appropriate mounting post 30, 31 to come up in contact with the stem around the appropriate cylindrical portion with a forked spacer member 42 as seen in the exploded view of FIGURE 7. The inserted spacer member serves the additional functional purpose of aligning the brackets 23 upon the electrodes into their symmetrical position for receiving the bead as illustrated in FIGURE 3 by operation of the bracket aligning member 44 which straddles the electrode and engages the respective arms 24 and 25 of the bracket 23 to position them in the manner illustrated by FIGURE 8. In the view of FIGURE 6 the bracket alignment member 44 is broken away and the spacer member 42 is shown in section to illustrate the manner in which it engages the cylindrical shaft position on the mounting stem 36 when it is pushed into its innermost position by means of the pin 46.

As may be seen from FIGURE 5, the independently moved spacer assemblies are in position between the various electrodes which are mounted upon the stems and are appropriately clamped in position after the stem is mated in apertures in the top alignment platform 32. The uppermost electrode which is the first control grid 18 fits around an interfitting extension of the stem which is held in bearing position in the corresponding aperture in the uper alignment platform 32. This interfitting piece of the stem 47 has an internal aperture 48 which interfits with the pin 49 upon the stem 36. The stem 49 serves to align the two grid holes in grid electrodes 18 and 19 so that the upper stem member 47 may be inserted into the top of the inverted first control grid 18 in final assembly position. Thus, all the cylindrical sections on the stem 49 are of decreasing diameter toward the top of the stem so that the stem 49 may drop out of the assembled gun, when cam 39 is slipped out from under the lower extension of stem 49.

In the final position these grid stems are locked into place by means of spring pressure on the cammed tightening lever members 50 which have one arm pinned into the top of the stem extension 47 to thereby press fit the stem upon the uppermost grid electrode 18 to hold all electrodes firmly in place in their final axial position with the appropriate spacing and proper mounting bracket alignment. After the bead is inserted through access passageways extending between each two adjacent guns in the area way between the mounting rods 30 and 31 into which the mounting bracket arms extend in symmetrical position, the top alignment platform 32 is removed after removing the spring pressure on the clamping cams 50. Then, with the pressure released from the electrodes and stems, the cam sliders 39 are retracted to let each of the mounting stem pins 36 drop in the contact with the limiting platform 40 so that the completed assembled electron gun assembly may be removed. Then the jig may be repositioned for assembly of a new electron gun assembly by repositioning of the stems 36 upon the slider cams 39 in the position as shown in FIGURE 6.

The beading machine

Figure 9:
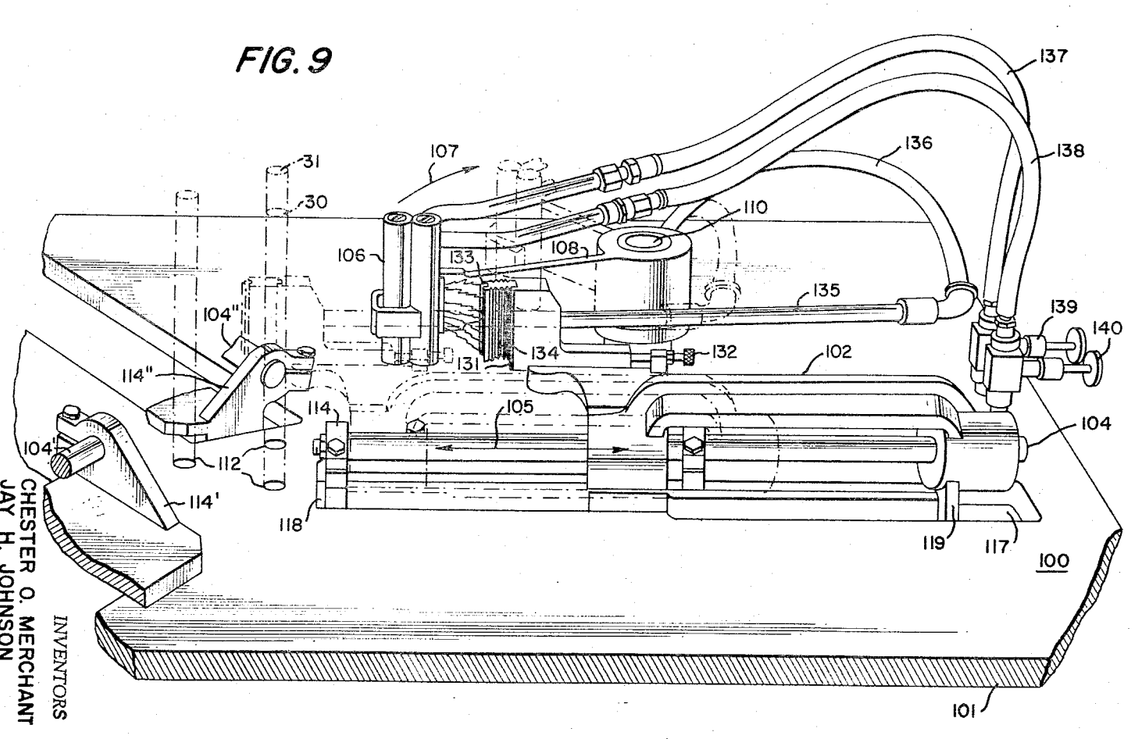
FIGURE 9 is a top perspective view of a glass bead insertion mechanism.
Figure 10:
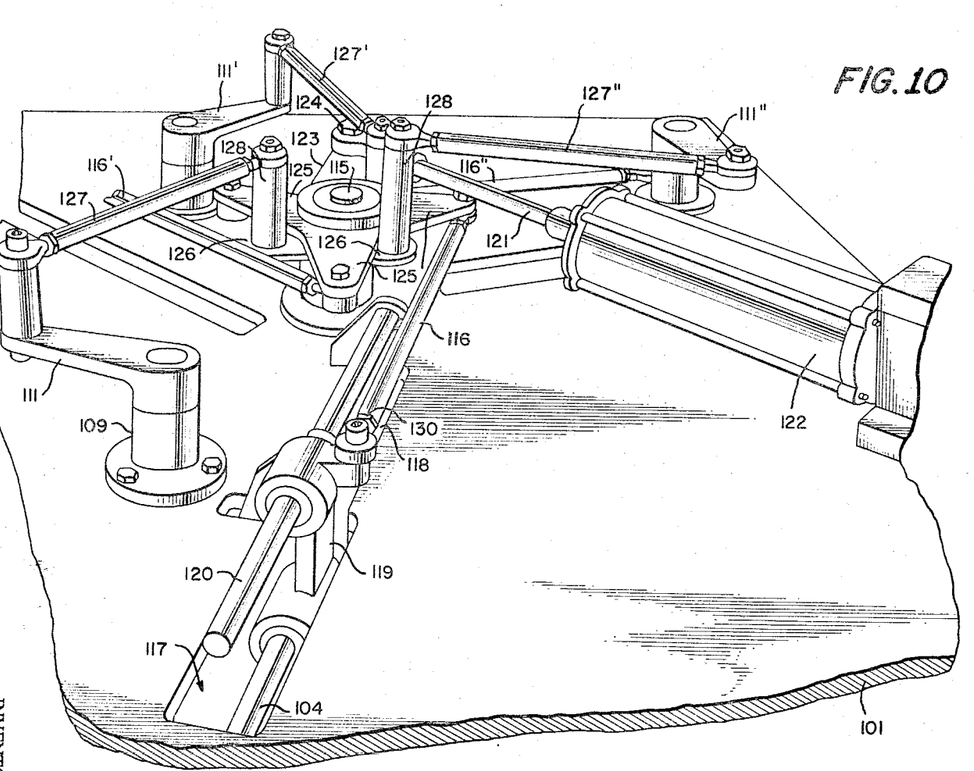
FIGURE 10 is a bottom perspective view of the bead insertion mechanism.

As seen from the top view of FIGURE 9 and the bottom view of FIGURE 10, the beading machine operates on the upper face 100 of mounting platform table 101 to move a bead holding assembly 102 from the bead heating station into phantom position at the bead insertion station. In this operation the assembly 102 is pushed reciprocally along bearing shaft 104 in the direction of arrow 105.

As the bead holding assembly 102 goes into its phantom position, the heater jets 106 are simultaneously pivoted in the direction of arrow 107 out of the path of movement by means of lever 108 which is mounted through platform table 101 and bearing 109 on the under side by means of shaft 110 to connect to the lever arm 111.

It is to be recognized that three similar symmetrically spaced assemblies are provided about the central three apertures 112 in table 101 for receiving the three jig mounting posts 30, 31, etc. to position the electron gun for receiving its respective three glass beads simultaneously. The drawing is broken away to show only a single assembly to simplify description and avoid complexity, but the end mounting brackets 114 for the other guide shafts 104' and 104" are shown in corresponding position for receiving the broken away remainder of the assembly which is identical to that assembly fully shown in side view in FIGURE 9. Similarly, in FIGURE 10, a single complete assembly connected by guided shaft 116 pushes the assembly 102 along through slots 117, 118 in the platform table 101 by means of bearing coupling 119 positioned between slide rods 104 and 120 is shown which is identical to two further not illustrated assemblies coupled to rods 116' and 116".

Figure 11:
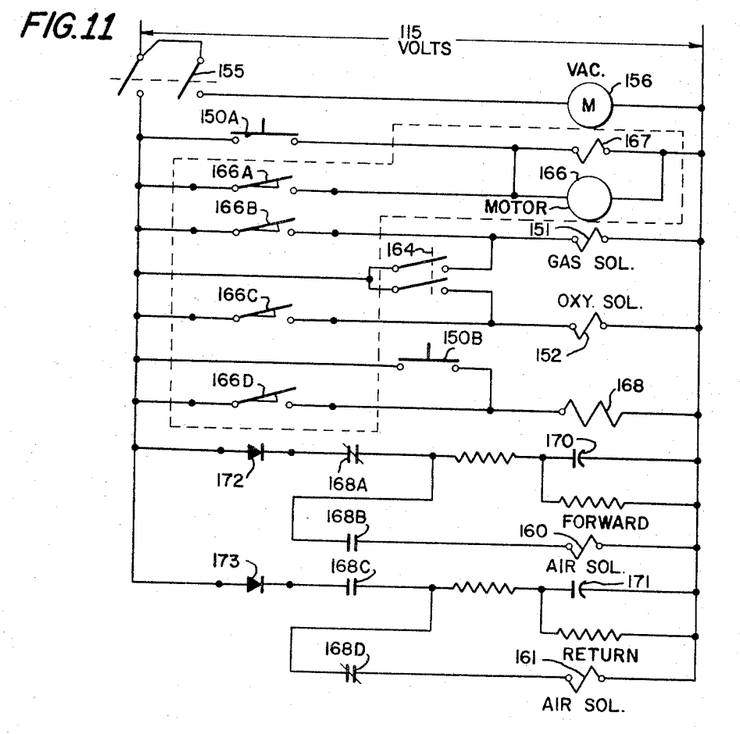
FIGURES 11 and 12 are control diagrams illustrating the operational cycle of the beading mechanism.

Simultaneous action of all moving members of the beading machine is under control of the reciprocation of the prime mover piston rod 121 extending from hydraulic piston chamber 122. This piston rod 121 is coupled to a star wheel 123 at pinion 124 to reciprocate about its pivotal shaft 115 six lever arms of which the other three lever arms 125 alternatively project at the upper level (as shown in FIGURE 11) from the pivot shaft to drive the guided shafts 116, while the lower level projecting arms 126 pivot the heater assembly levers 111 through rods 127 attached on posts 128.

The position of the end of the stroke of the movable bead holding assembly 102, which determines precisley the beading station location is affixed by adjusting the length of the shaft 116 through nuts 130.

Conversely, since the heater jets 106 (FIGURE 9) are fixed in position on pivot lever 108 and the position of assembly 102 is changed relative thereto during adjustment of shaft 116, the bead mount 131 is relatively adjustable on the bead moving assembly 102 by means of screw 132. Thus, the position that properly melts the face of glass bead 133 when extended toward the heater jets 106 may be chosen.

The beads 133 are held in position in a slot on the hardened and corrugated bead mount member 134 by means of reduced air pressure or vacuum in pipe 135. The assembly 102 is movable because of flexible hose coupling 136. Similarly, gas and oxygen are piped to the heater jets 106 by way of flexible hoses 137 and 138 and the gas pressure may be manually controlled by needle valves 139 and 140. In this way the gas to the jets and the jet positioning may be adjusted to properly melt the glass beads 133 by direct projection on the face of the bead 133 which is to be pushed into the electrode brackets. As the bead hardens, it serves as the sole means for holding the electrodes of the gun in final assembly position, and the jig may be disassembled for reinsertion of a new set of electrodes. The jig itself may be loaded remotely from the beading machine and easily exchanged by fitting the posts 31 into their apertured receptacle holes in table 101.

*The control system*

An electrical sequence control circuit diagram is shown in FIGURE 11 to control the system for one operation cycle upon closing momentary manual start button 150A. This system controls not only the prime mover but serves also to intensify the heat to the jets by control of the gas and oxygen supply with solenoid valves 151 and 152, also shown in FIGURE 12.

As the power switch 155 is closed the vacuum pump motor 156 serves to energize the bead holding system continuously through vacuum pipelines 135–136 (FIGURE 9), and also serves to supply a source of air for operation of the hydraulic prime mover system when solenoids 160, 161 are energized.

Control switches 166A–D are supplied to provide several controls over a period of time sequences determined by cams operated when timing motor 166 is energized, as start switch 150A is closed momentarily. Thus section 166A retains motor 167 in energized state until the motor cycles to release itself after the timing period set.

Figure 12:
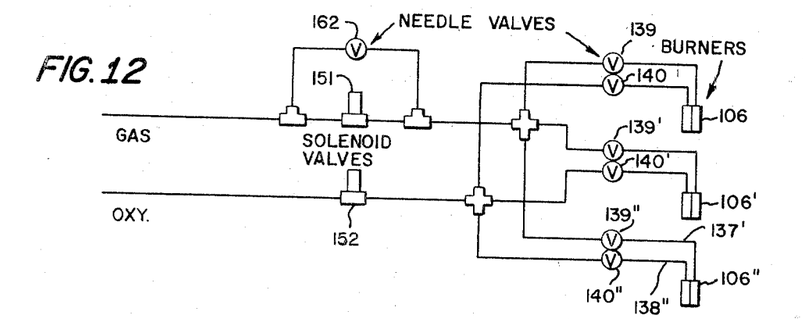

Sections 166B and C respectively, operate the solenoids 151, 152 to open the gas and oxygen supply lines for intensifying the heat maintained at pilot level through needle valve 162 in the gas line (FIGURE 12). A manual override switch 164 may be used if desired, to maintain the jets at intensified heat level, as might be required for example, in adjusting the jets for proper distance from the glass beads.

Manual switch 150B is an auxiliary manual switch used to control only the mechanical prime mover cycle where desired. This or automatic switch section 166D energizes relay 168. Timer switch section 166D provides an exact period of heating time for the bead before energizing relay 168 and thereby operating the prime mover through its cycle, when contacts 168A through D are changed.

Note that the energization of air solenoids 160, 161 is controlled by capacitors 170, 171, charged respectively through rectifiers 172, 173 when switches 168A and 168C are closed. Thus, when the start button 150B is pushed or time switch 166D is closed, capacitor 170 is fully charged and serves to actuate forward drive solenoid 160 by closing of solenoid contact 168D which serves to move the bead holder assembly into the insertion station. At this time capacitor 171 receives its charge through contact 168C so that the return air solenoid 161 can be energized after switch 166D is reopened and relay 168 drops out to reclose contacts 168D with capacitor 171 energized. Thus, a simple sequential fully automatic cycle of control is initiated by operation of start button 150A, and manual override is afforded by switches 164 and 150B.

Figure 13:
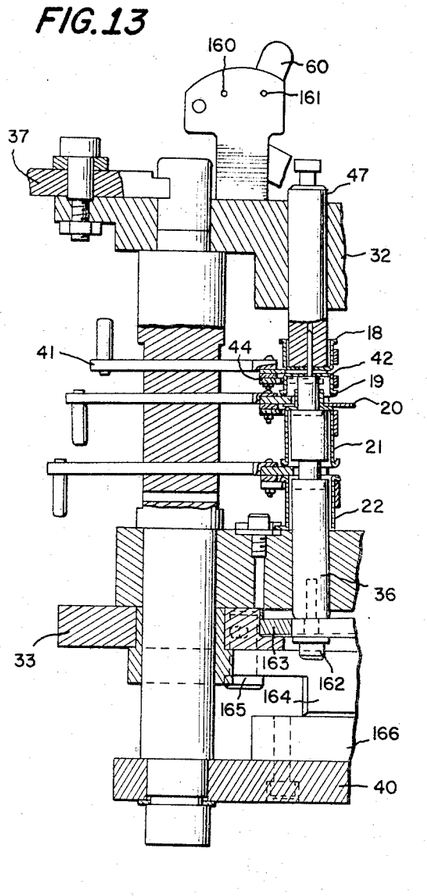
FIGURE 13 is a side view, partially in section, of a modified jig asembly.

The jig assembly of FIGURE 13 is similar to that hereinbefore described, and shows the electrodes 18–22 in assembled position with guides 41 in engagement at the inner limiting position with arms 42 between the electrodes and fingers 44 against the brackets.

On the broken away retraction lever 60 which lifts pin portion 47 is mounted a detent pin which engages either of two stable detented aperture positions 160, 161 shown as countersunk on the opposite side in other views.

Figure 14:
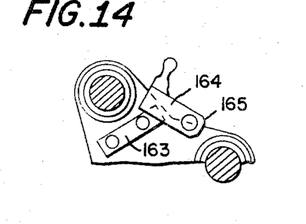
FIGURE 14 is a partial plan view of clamping means shown at A—A in FIGURE 13.

The bottom retraction means as partly shown in FIGURE 14 is modified to firmly clamp the elements exactly in place without resilient spring bias as shown in other embodiments. Thus, screw 162 holds retainer washer 163 on the end of stem portion 36. The stem 36 can drop down when holding pivot lever 164 pivoted about pin 165 is rotated out of engagement with the washer 163. The block 166 is a filler block to support pivot lever 164 in the seated position.

Figure 15:
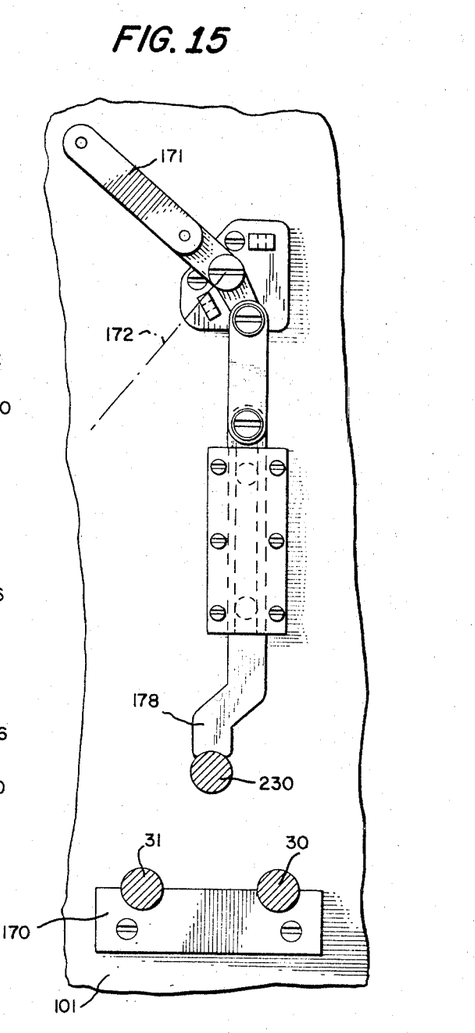
FIGURE 15 is a plan view of a clamp for positioning a jig assembly on the mounting platform table.

In placing the jig upon the apertured holes of the platform table 101 it is sometimes difficult to engage all three close fitting pegs in the mating holes. Accordingly, the alignment means of FIGURE 15 may be employed. Thus, block 170 receives two of the mounting posts 30, 31 which are manually positioned before clamp lever 171 is moved from open position at line 172 to its shown clamping position on post 230. Thus, the jig is firmly held and simply placed, but may also be simply released by motion of lever 171 back to position 172 to retract clamp arm 175.

Having, therefore, described the invention, its structural organization, and mode of operation, those novel features believed descriptive of the scope and nature of the invention are defined with particularity in the appended claims.

What is claimed is:

1. Apparatus for manufacturing a three beam electron gun assembly from a plurality of substantially cylindrical beam shaping electrodes each having a bracket with arms extending substantially tangentially from the cylindrical electrode on opposite sides of a segmental portion, comprising in combination,
    means including a gun jig platform with three unitary spaced stem removably mounted thereon to form a single replaceable jig element for holding electrodes in sequence along said three stems which are directed at a predetermined convergence angle to extend through said gun jig platform to establish the axis of three beams of each of a plurality of guns including three separate similar sets of electrodes of the three gun assembly starting from said platform with the three brackets positioned internally between the three guns so that the arms of the two adjacent electrode brackets extend between the two electrodes, movable means affixed to said platform introducing spacer elements on top of each set of three similar electrodes to extend between adjacent electrodes along the beam axis which are placed on top of the spacer elements to establish precise axial spacing between the electrodes along the beam path, means forcing said electrodes together firmly in final position upon the stems by axially forcing the electrodes together against said spacer elements, rod conveying means inserting along a straight line travel path from an external position three respective melted glass rods between each of two adjacent gun assemblies to engage and harden about all the extending bracket arms thereby to hold the electrodes permanently in position solely by support of the glass rods, means withdrawing the three stems individually through said platform while said gun assembly is held in the gun jig after the glass rods are affixed to permit the gun assembly to be removed without binding against the convergence angle of the stems, said rod conveying means including suction means holding the glass rods in a said external position near the assembled guns, means positioning a heater between the glass rods and the guns in said travel path to impinge a flame directly upon the face of the glass rods which melts the rods to engage the bracket arms, means removing the heater from the pathway between the glass rod and the guns after the glass is partially molten, and means pushing the partially molten glass bead along said linear travel path into engagement around the extending bracket arms.

2. A beading machine for assembling three beam color guns with bead receiving bracket arms comprising in combination: a reciprocating prime mover piston providing linear travel over a predetermined range, a rotating star wheel with six lever arms projecting therefrom coupled for a predetermined degree of reciprocating rotational movement by said prime mover, a set of three linear guided shafts excluding from alternate ones of said lever arms to move along a straight line, a bead holding assembly movable by said guided shafts along said straight line into two limiting positions to define respectively a bead heating station and a bead insertion station where the bead is impaled upon bracket arms, a set of three pivoted heater assemblies with the respective heaters positioned in the path of movement of each bead holding assembly while the face of the beads are melted and pivoted to move out of said path, and lever rods coupled to the respective remaining alternative lever arms of said star wheel to pivot said heaters out of the paths simultaneously with movement of the bead holding assemblies into the insertion station by rotation of said star wheel.

3. The machine defined in claim 2 including a shaft length adjustment on the guide shafts for defining with particularity the exact position of the bead insertion station limiting position.

4. The machine defined in claim 3 including a bead mount positionable relative to said bead holder assembly to precisely adjust the distance between the bead and the heater at said heating station.

References Cited

UNITED STATES PATENTS 3,340,035   9/1967   Hajduk _______________ 65—155

DONALL H. SYLVESTER, *Primary Examiner.*

E. R. FREEDMAN, *Assistant Examiner.*

U.S. Cl. X.R.

65—59, 154; 29—25.16, 25.19